INVENTOR.
JOHN KENT BOWKER

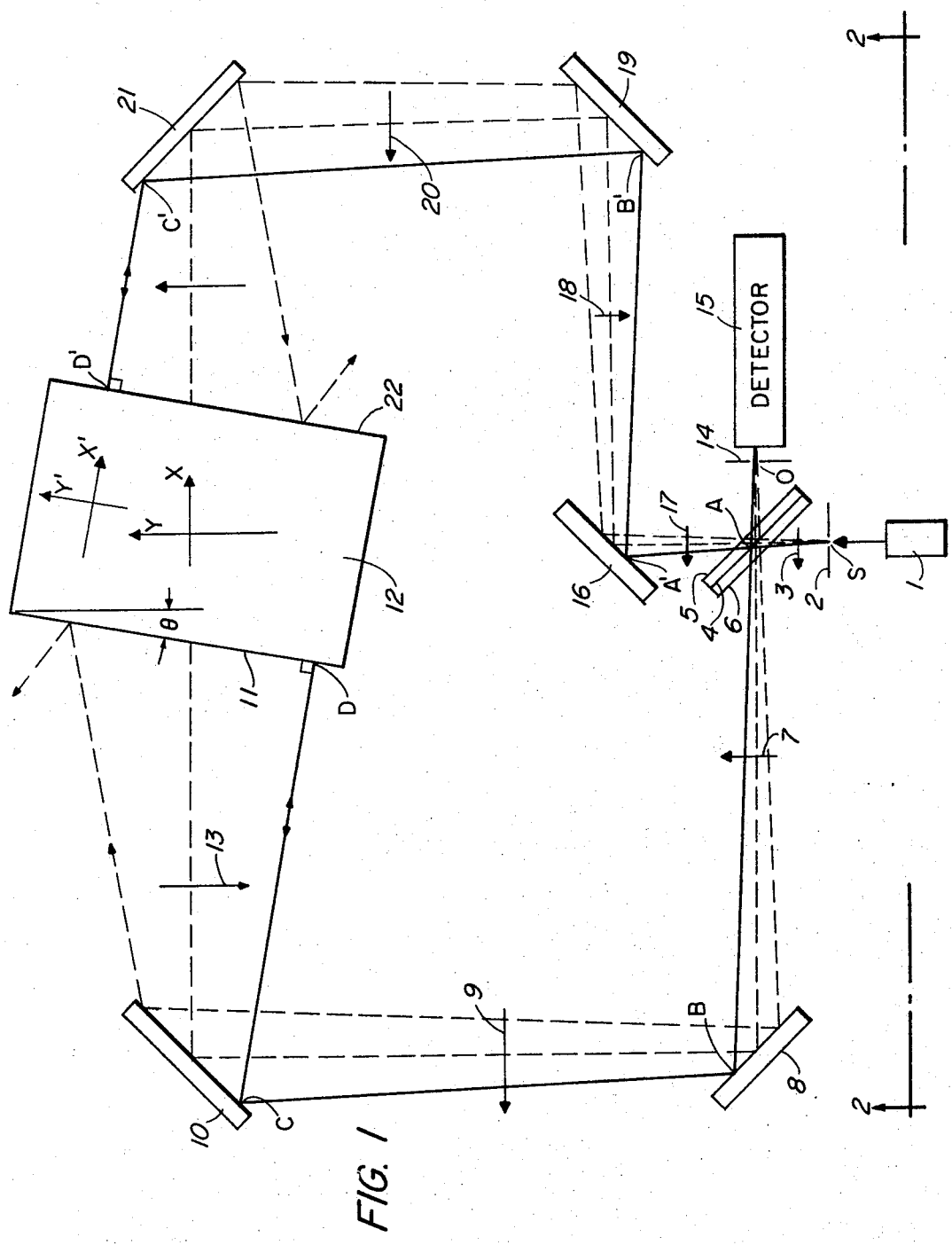

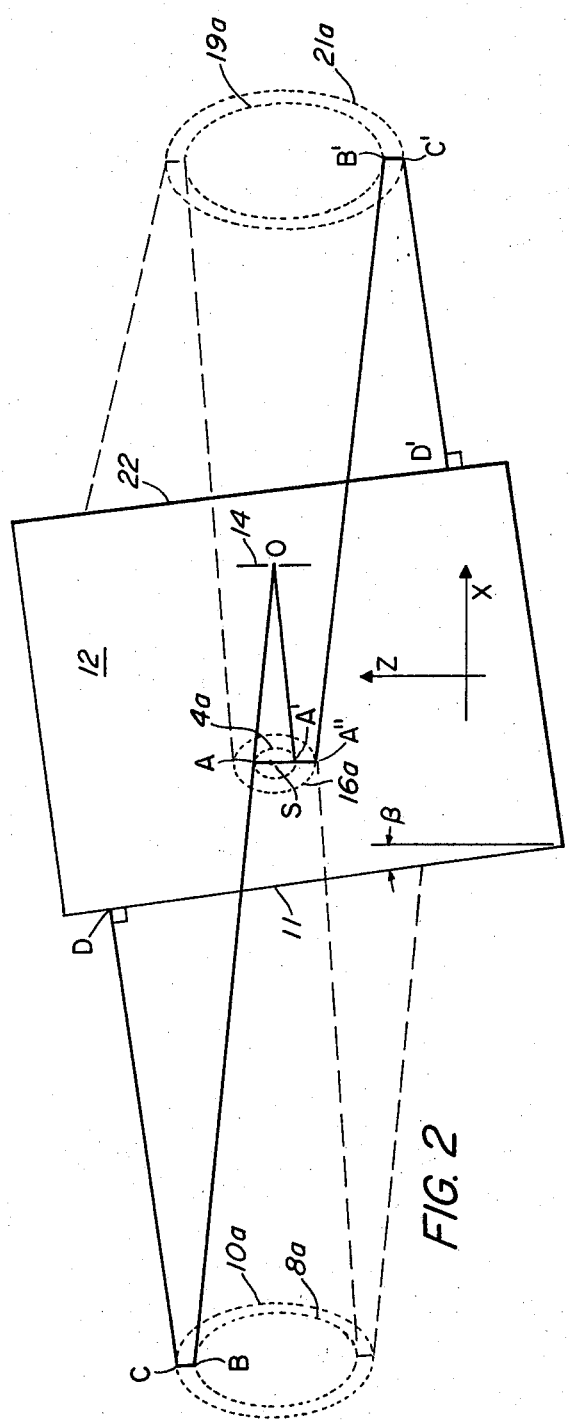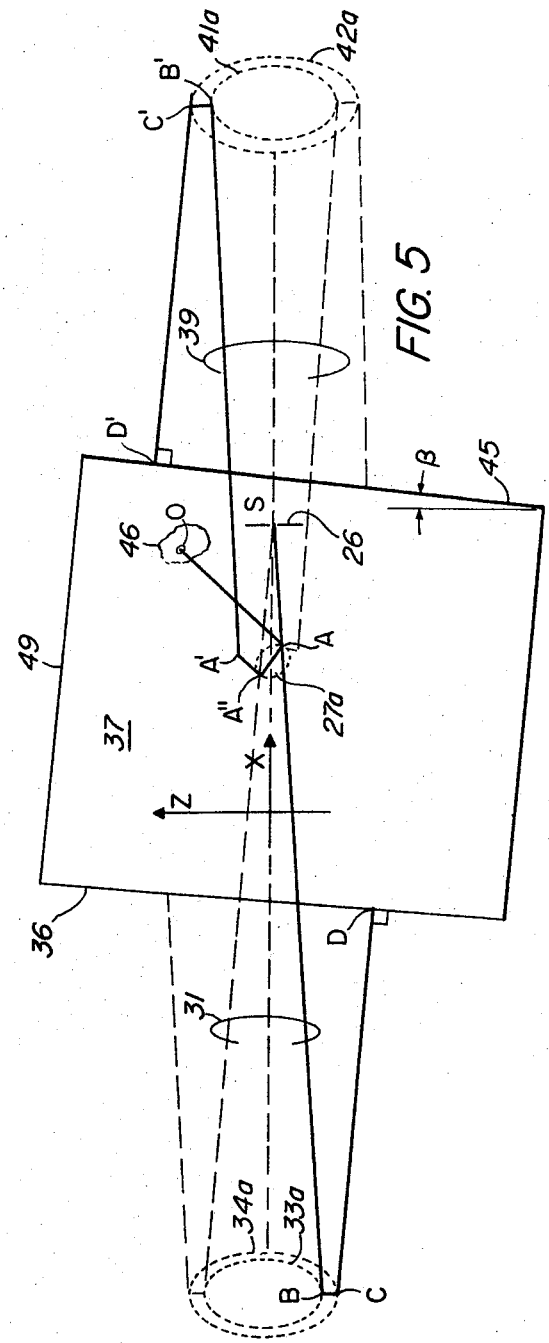

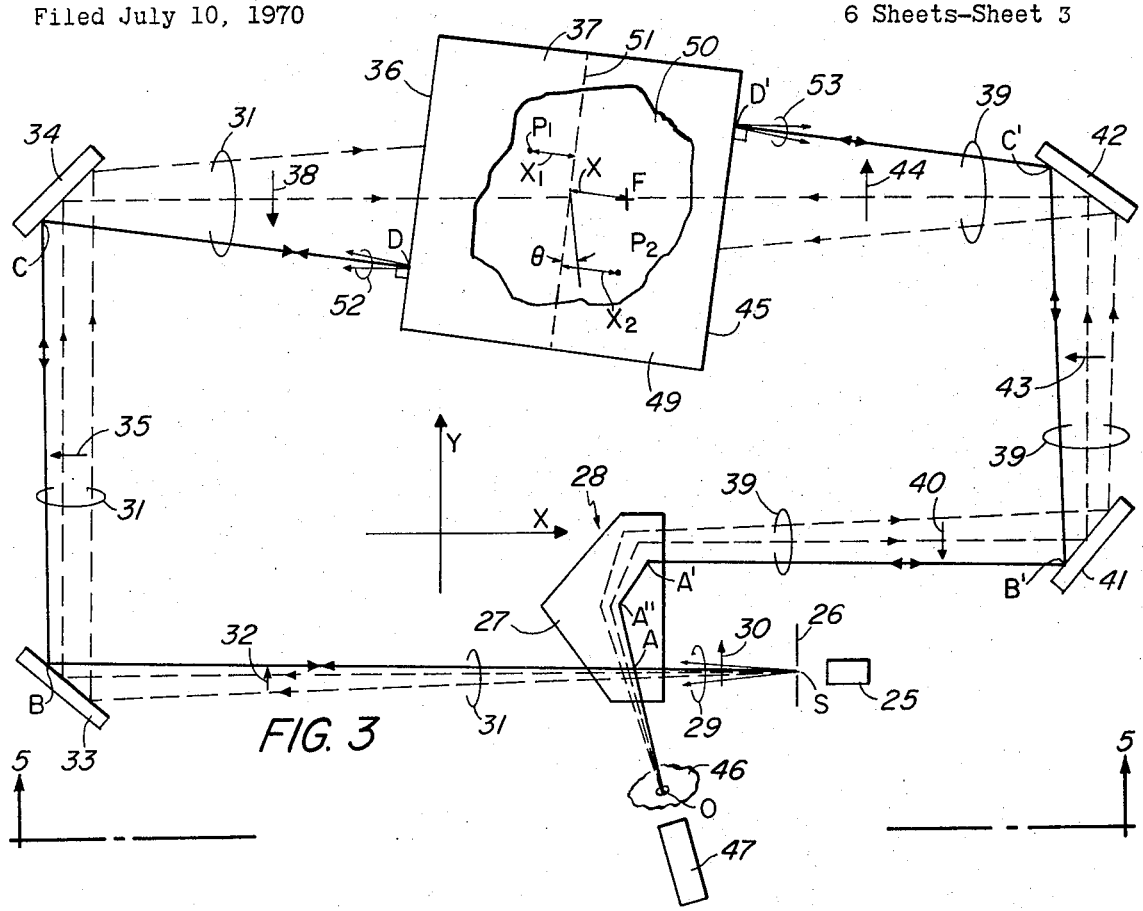
FIG. 3
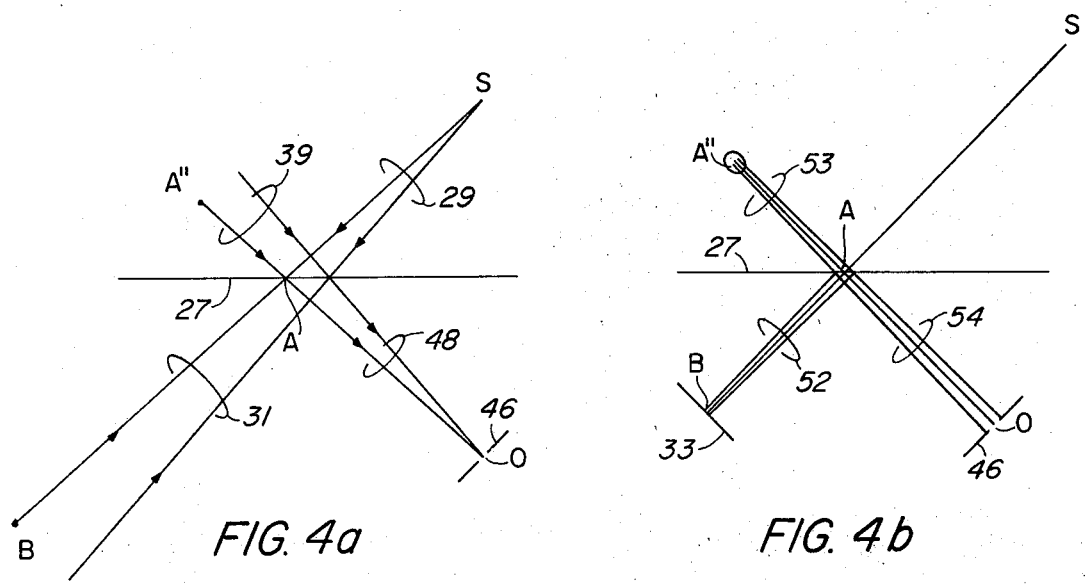
FIG. 4a
FIG. 4b
INVENTOR.
JOHN KENT BOWKER
BY Rich & Ericson
ATTORNEYS

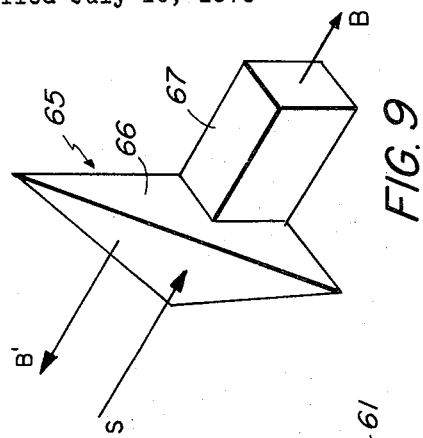
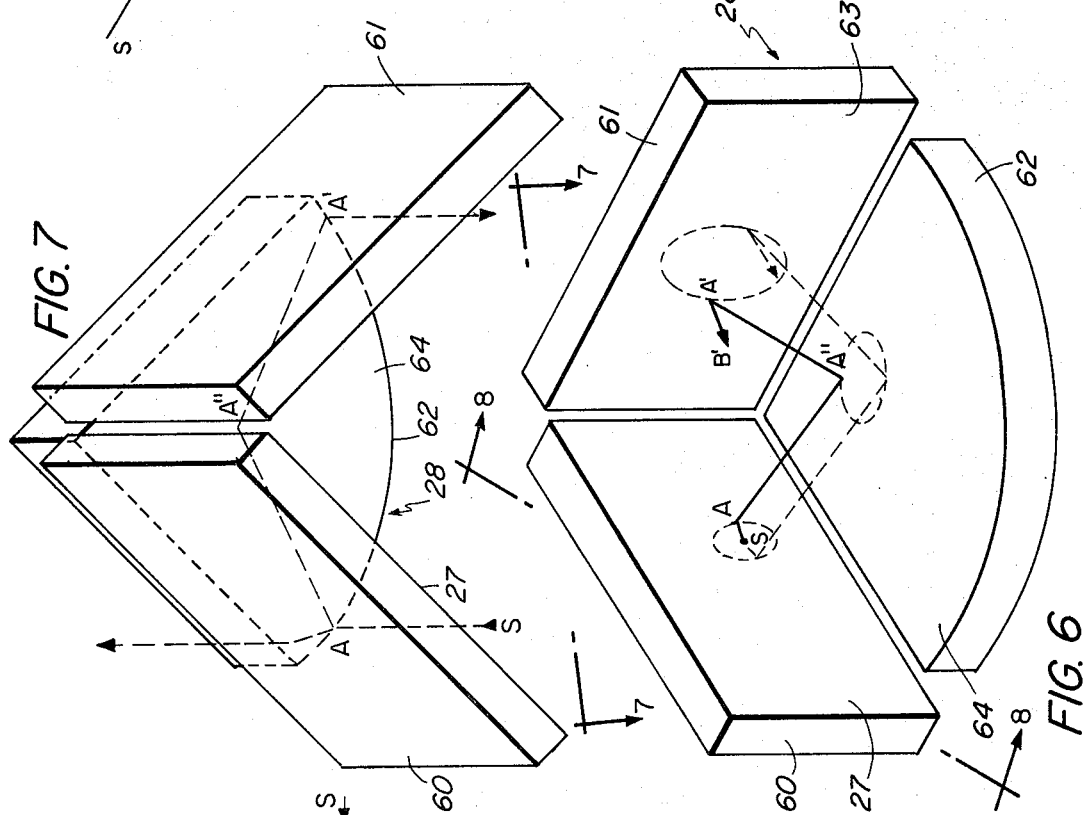
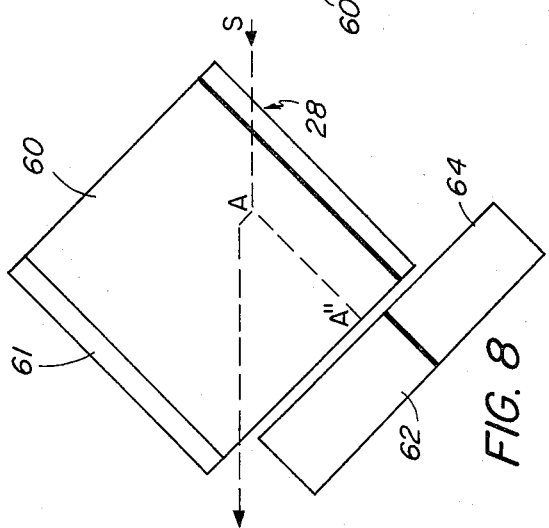

ATTORNEYS

June 20, 1972   J. K. BOWKER   3,671,130
INTERFEROMETER OF THE CENTER BALANCE TYPE
Filed July 10, 1970   6 Sheets-Sheet 6

INVENTOR.
JOHN KENT BOWKER
BY
ATTORNEYS

United States Patent Office 3,671,130
Patented June 20, 1972

3,671,130
INTERFEROMETER OF THE CENTER BALANCE TYPE
John Kent Bowker, Marblehead, Mass., assignor to Itek Corporation, Lexington, Mass.
Filed July 10, 1970, Ser. No. 53,770
The portion of the term of the patent subsequent to Aug. 3, 1988, has been disclaimed
Int. Cl. G01b 9/02
U.S. Cl. 356—106    16 Claims

ABSTRACT OF THE DISCLOSURE

An interferometer of the center balance type incorporating a substantially isotropic, coherent light source, a retroreflector having a beam splitting surface and a stage plate comprising a pair of opposed parallel mirrors in the optical path. The optical path difference is proportional to the distance from the optical fiducial to a plane equidistant from and parallel to the mirrors of the stage plate, and is invariant with respect to other translations or rotations of the stage plate so long as the mirrors remain in the optical path.

CHARACTERIZATION OF THE INVENTION

The invention is characterized by means for splitting a beam of coherent radiation into two divergent beams, means for directing said divergent beams onto opposed parallel reflectors at angles such that corresponding rays in said divergent beams are normal to said reflectors independently of the angle between the mirrors and the central ray in each of said diverging beams, and means for receiving rays reflected normal to said mirrors to form an interference pattern.

SPECIFICATION

My invention relates to interferometers, and particularly to an improved interferometer that is insensitive to movements of the object being measured except those along a selected axis of measurement.

In my copending U.S. application for Letters Patent Ser. No. 698,821, filed on Jan. 18, 1968 for Interferometer, now Pat. No. 3,597,091, issued Aug. 3, 1971, and assigned to the assignee of this application, I disclosed an interferometer in which the optical path difference is directly proportional to translations of the stage plate along a selected measurement axis, and invariant with respect to other movements of the stage plate. I have since discovered that while the apparatus shown in that application is insensitive to rotations about a first pair of orthogonal axes, and to translations along axes normal to the measurement axis, it is subject to malfunction in the presence of rotations about a third axis normal to the first pair.

The difficulty was found to arise, not from any variations in optical path length difference, but because the interfering rays came from different points in the wavefront from the source. The apparent insensitivity of the appaartus to rotations about the third axis was found to result from the choice of a heavy granite slab as the base support for the apparatus, together with a heavy sled carrying the stage plate for sliding movement on the block. That arrangement limited any excursions of the stage plate about the third axis to those too small to detect. The object of my present invention is to provide an interferometer in which the fringe pattern formed changes only upon translation along the measurement axis, and is insensitive to translations along orthogonal axes, and to rotations about any axis.

Briefly, the above and other objects of my invention are attained by an interferometer including an isotropic light source, a stage plate carrying opposed parallel mirrors, and an optical circuit including a retroreflector having a beam splitting surface. As will appear, that arrangement results in an interferometer in which the fringe pattern formed is affected only by movements along the axis of measurement. Consequently, the position of the stage plate can be tracked continuously during motion in the presence of perturbations.

The apparatus of my invention, and its mode of operation, will best be understood in the light of the following detailed description, together with the accompanying drawings, of various illustrative embodiments thereof.

In the drawings;

FIG. 1 is a schematic diagram of the interferometer shown in my above cited copending application and a relatively movable stage plate therein for purpose of illustration and comparison;

FIG. 2 is a schematic and diagrammatic, fragmentary side view of the apparatus of FIG. 1, taken substantially along the lines 2—2 in FIG. 1, with parts omitted and parts diagrammatically shown, included to illustrate the problem that I discovered in the operation of the apparatus of FIG. 1 in the presence of a rotation of the stage plate about one axis;

FIG. 3 is a schematic plan diagram of an interferometer in accordance with my present invention including a movable stage plate and illustrating the mode of operation of the interferometer in response to rotation of the stage plate about an axis normal to the plane of the figure;

FIGS. 4a and 4b are diagrams illustrating the location of the exit aperture in the apparatus of FIG. 3, and the light rays entering that aperture, respectively;

FIG. 5 is a schematic and diagrammatic, fragmentary side view of the apparatus of FIG. 1, taken substantially along the lines 5—5 in FIG. 3, illustrating the operation of the apparatus in the presence of a rotation of the stage plate about an axis in the plane of FIG. 3;

FIG. 6 is a diagrammatic, orthogonal sketch of a retroreflector forming a part of the apparatus of FIGS. 3 and 5;

FIG. 7 is an orthogonal sketch of the apparatus of FIG. 6, taken substantially along the lines 7—7 in FIG. 6;

FIG. 8 is a schematic, orthogonal sketch of the apparatus of FIG. 6, taken substantially along the lines 8—8 in FIG. 6;

FIG. 9 is a diagrammatic sketch of a modified retroreflector useful in the apparatus of FIGS. 3 and 4;

Figure 10:
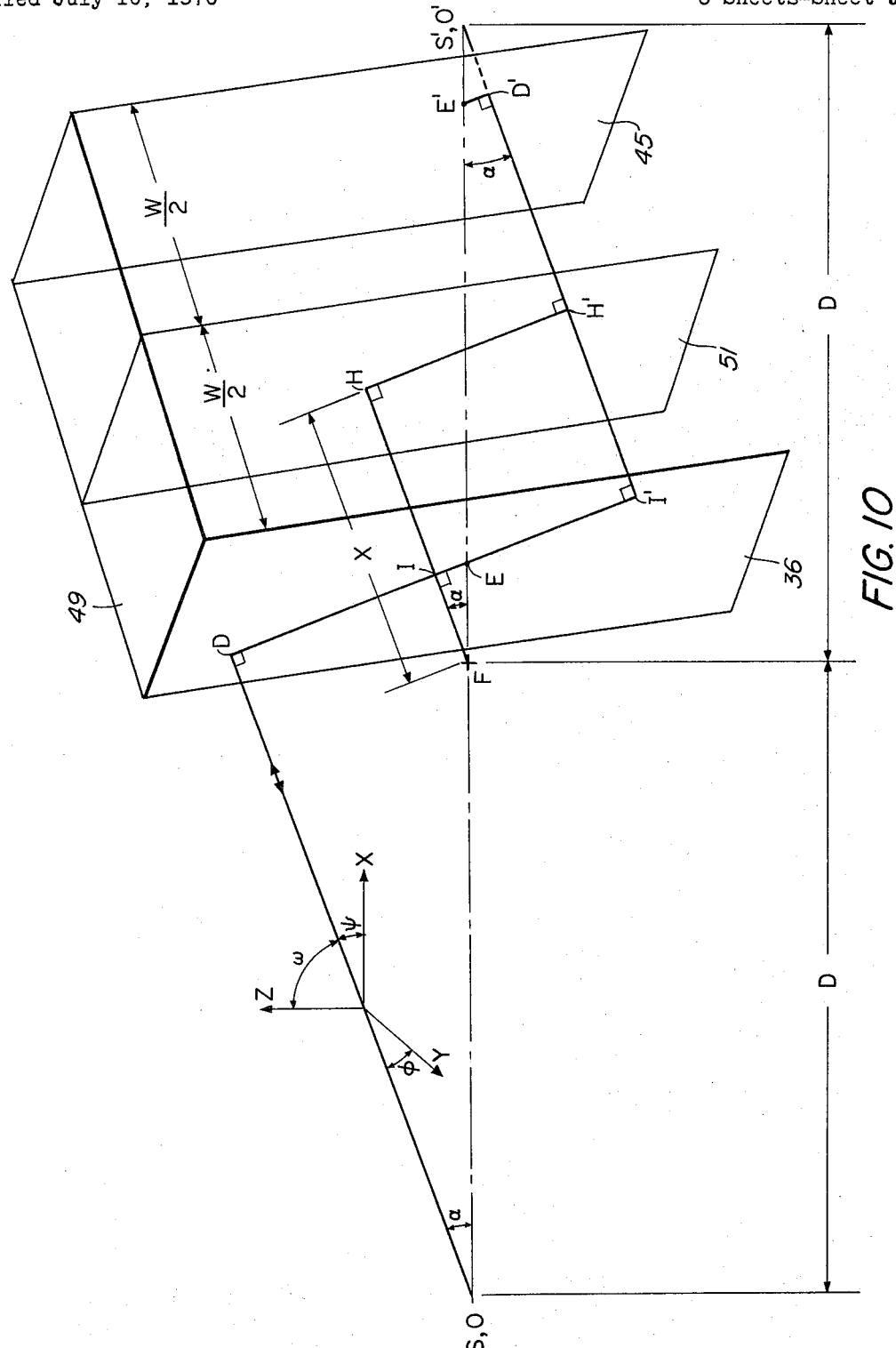
FIG. 10 is a graphical simulated three-dimensional diagram illustrating certain relationships between the stage plate and the unfolded optical axis in the apparatus of FIGS. 3 and 5, illustrating an invariant property of the apparatus.

Referring to FIG. 1, I have illustrated an interferometer of the kind more fully disclosed in my above cited copending application Ser. No. 698,821. The apparatus includes preferably a monochromatic source of light that is coherent, as is most conveniently provided by a laser diagrammatically indicated at 1. Light from the laser 1 is focused on a pin-hole S formed in a mask 2 to form a spherical output wave-front, originating substantially at the point defined by the center of the pinhole.

An arrow 3 indicates a reference directional sense in the bundle of rays emerging from the pinhole. This bundle of rays falls on a beam-splitter comprising a semireflecting surface 4. The surface 4 is located at the interface between two panes of optical glass 5 and 6 to form equal glass paths in the right and left beams, to be described.

A portion of the light falling on the beam-splitting surface 4 is reflected to the left as shown in FIG. 1 and forms a diverging beam with a reference sense rotated to the position shown by the arrow 7. This diverging beam impinges on a mirror 8 at 45 degrees to the central axis of the beam.

From the mirror 8 there is reflected a divergent beam of light having its sense rotated to the position shown by the arrow 9. That beam falls on another mirror 10 located at 90 degrees to the mirror 8.

The beam reflected from the mirror 10 falls on a mirror 11 formed on one side of a stage plate 12. The beam impinging on the mirror 12 has a sense indicated by the arrow 13, in the plane of the drawing. It will be seen that there is one ray of light in the beam from the source S, namely the ray SABCD, which impinges on the mirror surface 12 normal to that surface. That ray, and only that ray, is returned along its original path, namely the path DCBA. A portion of the light in this ray then goes through the beam splitting surface 4 and falls on a pinhole O formed in a mask 14. Light passing through the pinhole O falls on a detector 15.

In addition to the normally reflected ray DCBAO, the small bundle of substantially parallel rays about the normal ray will enter the pinhole O. These rays are reflected from a region centered at D on the mirror 12 and having a diameter approximately one-half the diameter of the source pinhole at S.

A portion of the light from the source S passes through the beam splitting surface 4 and falls onto a mirror 16 at 45 degrees to the central ray from the source S. The directional sense of the beam from the source is unchanged by the passage through the beam splitting surface 4, as indicated by the arrow 17, and is rotated to the position shown by the arrows 18 upon reflection from the mirror 16.

Light from the mirror 16 is reflected from a mirror 19, rotating the light path 90 degrees relative to the incident path and rotating the image sense of the beam to the direction indicated by the arrow 20. Light from the mirror 19 falls on a mirror 21 at 90 degrees to the mirror 19. The central beam deflected from the mirror 21 is in colinear alignment with the central ray from the mirror 10.

Light from the mirror 21 falls on a mirror surface 22 formed on the stage plate 12 parallel to the mirror surface 11 on the other side of the stage plate. One ray in the bundle reflected from the mirror 21 strikes the mirror at the normal, indicated at D′, and is returned along its original path. The total path length transversed by this beam is the path SAA′B′C′D′C′B′A′AO. That ray, and its associated nearly normal neighbors that are close enough to D′ to return to the pinhole O, are returned to the pinhole O and interfere with the rays from the right hand beam described above.

It will be seen that so far as the diagram of FIG. 1 is concerned, the same initial ray SA that forms the right hand beam is divided and forms the left hand beam, so that, all other things being equal, a centered circular fringe pattern should be formed. However, as will next be described with respect to FIG. 2, that will not occur if the stage plate 12 is tilted about an axis lying in the plane of the illustration.

FIG. 2 is a sketch of a portion of the apparatus of FIG. 1 taken essentially along the Y axis as indicated by the arrow 2—2 in FIG. 1. FIG. 2 shows the stage plate 12 tilted at an angle $\beta$ to the Z axis about the Y axis.

The region of impingement of light from the source S on the beam splitting surface 4 is shown by the dotted ellipse 4a. Light reflecting from the mirror 4 falls on the mirror 8 in a manner indicated by the ellipse 8a, and thence proceeds to the mirror 10 to impinge within a larger ellipse, as indicated at 10a.

A normal ray impinges on the mirror 11 at D. Thus, the effective ray in the left hand beam as seen in FIG. 2 is the ray SABCD. This beam returns along the path DCBAO to the exit pinhole.

In the opposite beam, the zone of impingement of the rays falling on the mirror 16 as shown by the dotted ellipse 16a, on the mirror 19 at 19a, and on the mirror 21 at 21a. It will be seen that the normal beam impinging at D′ is the ray SA′A″B′C′D′ which returns along the path D′C′B′A″A′O. The rays from the opposite beams are selected from different portions of the light from the source S, causing the interfering wavefronts to be tilted, thus decentering the circular pattern, if not displaying straight Young's fringes.

FIG. 3 shows an interferometer in accordance with my invention in which the effects of stage plate wobble about all axes are compensated. The apparatus requires a source that is isotropic over the region of use, and that is coherent. This light is provided by a laser diagrammatically indicated at 25.

Light from the laser 25 is focused on a pinhole S formed in a mask 26 to generate a substantially spherical wave-front. Light from the pinhole source S falls on a beam splitting surface 27 comprising one reflecting face of a retroreflector, shown diagrammatically as a corner cube generally designated 28.

The arrow 30 will be chosen as a directional image sense reference for the beam 29 emerging from the pinhole. A portion of the light from this beam will pass through the beam splitting surface 27 to form an emerging bundle of rays 31 having an unchanged sense, as indicated by the arrow 32.

The bundle 31 falls on a mirror 33 aligned at 45 degrees to the central ray in the bundle of rays 31. The light impinging on the mirror 33 is reflected to a mirror 34 located at 90 degrees to the mirror 33. In the passage from the mirror 33 to the mirror 34, the image sense of the diverging bundle of rays 31 is rotated 90 degrees, as indicated by the directional arrow 35.

The bundle of rays 31 reflected from the mirror 34 falls on a mirror 36 formed on one side of the stage plate 37. The sense of the rays impinging on the mirror 36, so far as the XY plane of FIG. 3 goes, is indicated by the arrow 38.

A portion of the bundle of rays 29 impinging on the retroreflector 28 is internally reflected twice and emerges as a bundle of rays 39 having a sense indicated by the arrow 40. The retroreflector 28 has the property that it will return an incident ray parallel to itself, if the incident ray is in the acceptance aperture of the retroreflector. Thus, the entering ray SA will emerge as a ray A′B′ parallel to the original ray SA.

The bundle of rays 39 falls on a mirror 41 located at 45 degrees to the central ray in the bundle 39, and is reflected from the mirror 41 to a mirror 42, located at 90 degrees from the mirror 41. The directional sense arrow 43 illustrates the relative image field in the path from the mirror 41 to the mirror 42. An arrow 44 indicates the relative image sense in the diverging beam 39 reflected from the mirror 42.

The beam 39 falls on a mirror 45 formed on the side of the stage plate 37 parallel to the mirror 36.

An exit pinhole O is formed in a suitable mask 46, and located in position to be described in connection with FIGS. 4a and 4b below. Light passing through the exit pinhole O falls on a detector 47. The detector 47 may comprise a conventional optical intensity indicator, and may be associated with a conventional fringe counter. A bidirectional counter may be included, as more fully described in my above cited copending application.

The components comprising the laser 25, mask 26, retroreflector 28, mirrors 33, 34, 41, and 42, the mask 46 and the detector 47 are all relatively fixed together and secured to a solid bed so that they are relatively fixed and fixed in a first frame of reference relative to a set of orthogonal coordinates X and Y. An optical fiducial F is also fixed in this frame. The fiducial F is located at a point along the common central axis of the beams 31 and 39 that is equidistant from S along a first path over the central ray of the beams 29 and 31, and along a second path over the central ray of the beams 29 and 39.

Referring to FIG. 4a, the pinhole O is located relative to the beam splitting surface 27 at a point of intersection of rays returning along the paths of the diverging rays 39 and on the paths of rays reflecting from the surface 27 from the beam 31 returning from B to A. The path length OA is thus equal to path length SA. The pinhole O is thus located geometrically by construction. As will appear, however, there is in practice no convergent bundle of rays falling on the pinhole O; the converging bundle 48 that is shown in FIG. 4a is the locus of the possible set of returning rays, each present in only one position of the apparatus in the first frame relative to the stage plate.

The stage plate 37 may be a hollow box composed of mirrors within which the object is placed, or may be made of a solid glass plate so that the object can be placed face down on the surface. The sides of the stage plate are formed as or attached to the mirrors 36 and 45. The stage plate 37 is formed with an upper surface 49 normal to the planes of the mirrors 36 and 45.

The stage plate 37 may be mounted in any convenient way for movement relative to the fixed frame and to the coordinate system X, Y. As shown in FIG. 3, the stage plate 37 has been shown tilted at an angle $\theta$ about an axis Z normal to the axes X and Y. There is a center plane 51 equidistant from the mirror surfaces 36 and 45. That plane serves as a reference plane in a second frame of reference fixed relative to the stage plate 37. An object 50, such as a photograph, may be fixed to the stage plate. Points such as P1 and P2 on the object 50 may be relatively located with the apparatus in a manner to be described.

Operation of the apparatus in FIG. 3, relative to the XY plane, will next be described. A ray SA from the source to the beam splitting surface 27 will be continued in the beam 31 along the ray ABCD. D is the normal to the mirror 36. This ray SABCD will be returned along the path DCBA, and a portion of that ray will be reflected from the beam splitting surface 27 to the pinhole O. None of the other rays in the bundle 31 will be returned along its incident path. There is a small bundle of rays 52, emanating from a region on the mirror 36 about half the size of the pinhole O and centered about the intersection D of the normal which, though not returning along their incident path, will reenter the pinhole O, as illustrated in FIG. 4b.

The same ray SA that formed the ray AB by transmission through the beam splitting surface 27 is partly reflected to A'' in the retroreflector, and thence along the path A''A'B'C'D'. The ray C'D' is normal to the surface of the mirror 45, and it is returned along the path D'C'B'A'A''AO to the exit pinhole. A small bundle of rays 53, near the normal, will also reenter the pinhole. Thus, so far as the XY plane is concerned, rotation of the stage plate will not result in the wrong rays interfering, or instrument misalignment.

The operation of the apparatus of FIG. 3 with respect to the XZ plane will next be described in connection with FIG. 5. In FIG. 5, the stage plate 37 has been shown tilted by an angle $\beta$ about the Y axis with respect to the Z axis. As above, intersections of the beams 31 and 39 with the mirrors in their optical paths are shown by dotted ellipses identified with the reference character of the mirror followed by the suffix a. The intersection with the beam splitting surface 27 is similarly shown, at 27a. Because of the tilt of the stage plate through the angle $\beta$, the normal to the mirror 36, at D, now occurs below the optical axis. The right hand beam proceeds from S to A'', with internal reflections to A' to A' to form a beam A'B' parallel to SA that continues along the path B'C' to the normal at D'. The ray D'C'B'A'A''AO that interferes with the left normal returning ray DCBAO was therefore derived from the same ray SA from the source as the left ray. It is apparent that the path length difference sensed by counting fringes at the detector 47 will be invariant with respect to all rotations of the stage plate.

FIGS. 6, 7, and 8 show one manner in which the retroreflector 28 can be constructed. As shown, the beam splitting surface 27 can be formed on one side of a glass block 60. Two glass blocks 61 and 62 are provided with mirror surfaces 63 and 64, respectively. The blocks 60, 61, and 62 are relatively mounted in fixed relationship such that the surfaces 27, 63, and 64 are mutually orthogonal.

The manner of reflection of the ray SAA''A'B' in the retroreflector is schematically indicated in FIG. 6 through FIG. 8.

Another approach is illustrated in FIG. 9. Here, the retroreflector comprises a solid glass corner cube 65 having a beam splitting surface 66 formed at the interface with a glass block 67 is attached to the beam splitting surface 66. The length of the glass block 67 is chosen to introduce a glass path in the path of the transmitted beam equal to the glass path in the corner cube for the retroreflected beam SB'.

FIG. 10 illustrates the response of the interferometer of FIGS. 3 and 4 to rotations of the stage plate. In order to simplify the description, an unfolded optical path has been employed. This path extends from the source S to the fiducial F that is equidistant from a virtual source S'. The planes of the mirrors 36 and 45, and the center plane 51, have been translated and rotated with respect to the first frame of reference including the reference coordinate axes X, Y and Z. As illustrated, the inclination is such that the normal from S to D is inclined to the X axis by an angle $\psi$, to the Z axis at angle $\omega$, and to the Y axis by an angle $\phi$. The result is that the normal SD, and its return ray DO, is inclined to the optical axis SFS' by an angle $\alpha$. The normal S'D' to the mirror 51 is parallel to SD by virtue of the fact that the planes of the mirrors 36 and 51 are parallel, and that all normals to these planes are consequently parallel. The plane defined by the optical axis SFS' and the normal S'D' is, therefore, the same plane as that defined by the optical axis SFS' and the normal SD. The line DE is necessarily in the same plane, as is the line D'E'.

The normal from the fiducial F to the line DE will thus fall at I, a point along the line DE and in the common plane. An extension of the normal FI to the plane of the mirror 36 intersects the center plane 51 at H. The distance from the point F to the plane 51 along a normal to the plane 51 will be defined as $x$. The distance from the center plane 51 to each of the mirrors 36 and 45 is $W/2$. An extension of the normal S'D' to the mirror 45 intersects the mirror 51 at H', and the mirror 36 at I'. From the above considerations, the following relations follow:

$$IH = \frac{W}{2}$$

$$FI = x - \frac{W}{2}$$

$$FE = \frac{1}{\cos \alpha}\left(x - \frac{W}{2}\right)$$

$$\frac{SD}{\cos \alpha} = D + \frac{1}{\cos \alpha}\left(x - \frac{W}{2}\right)$$

$$SD = D \cos \alpha + x - \frac{W}{2}$$

$$S'E = D - \frac{1}{\cos \alpha}\left(x - \frac{W}{2}\right)$$

$$S'I' = \cos \alpha\left(D - \frac{1}{\cos}\alpha\left(x - \frac{W}{2}\right)\right)$$

$$S'D' = D \cos \alpha - x + \frac{W}{2} - W$$

$$S'D' = D \cos \alpha - x - \frac{W}{2}$$

Thus, the optical path length difference, given by $2(SD - S'D')$ is equal to $4x$. The measurement given by the fringe count $n$ will be $n\lambda/4$, where $\lambda$ is the wavelength of the source.

As it will appear from the above analysis, the optical path difference measured by the interferometer of FIGS. 3 and 4 is invariant with respect to rotations of the stage plate relative to the first frame of reference and its relatively fixed coordinate system XYZ. Since the distance $x$ from the optical fiducial F to the center plane 51 was derived without reference to the coordinates of any point on the stage plate in directions normal to $x$, it will be seen that the interferometer also has an optical path difference that is invariant with respect to translations other than those along a line normal to the center plane of the stage plate and intersecting the fiducial.

Operation of the apparatus of FIG. 3 to make measurements on an object 50 attached to the stage plate 37 may be conducted in the manner more fully described in my above-cited copending application and briefly outlined below. As noted, the interferometer is sensitive to the distance $x$ from the fiducial to the center plane 51 of the stage plate 37. Operation will be discussed in connection with the measurement of the distance from the point P1 to the point P2 along a normal to the plane 51. First, a microscope provided with cross hairs projected coincident with the fiducial is focused on the fiducial. The stage plate is then moved until the point P1 is in focus and in alignment with the cross hairs. That operation brings the point P1 to the fiducial. During that process, the fiducial moves with respect to the stage plate center plane 51 first by the distance $x$, and then by the distance $x1$ along a normal from the plane 51 to P1. The stage plate is then moved, while counting interference fringes by means of the detector 47, until the point P2 coincides with the fiducial. During this process, the displacement of the fiducial relative to the center plane 51 along the direction normal to the center plane is the sum of the distances $x1$ and $x2$. It is that distance that will be represented by the count detected by the detector 47, multiplied by $\lambda/4$ as noted above. Note that the distance to the fiducial is continuously presented.

Figure 11:
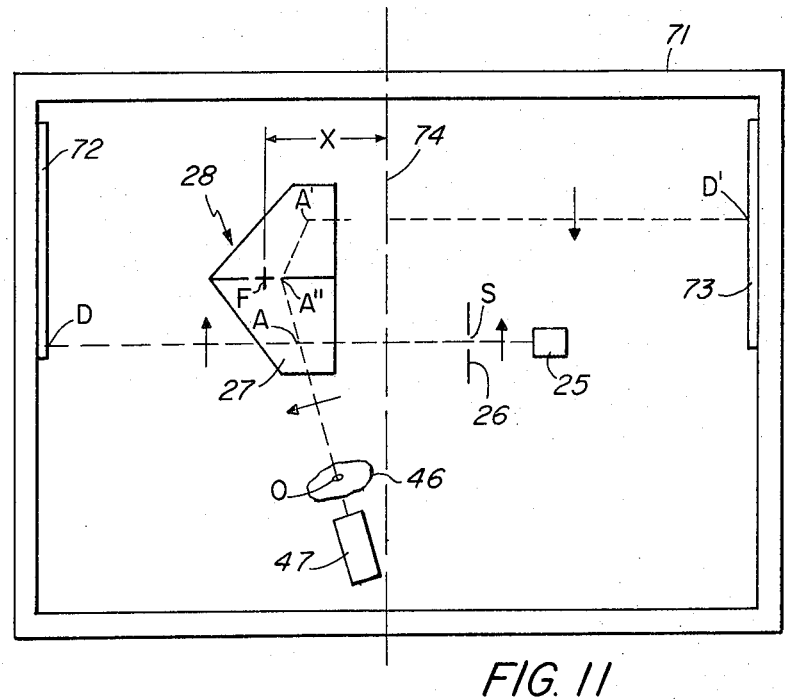
FIG. 11 is a diagrammatic plan sketch of a modified interferometer in accordance with my invention.

FIG. 11 shows a modification of the interferometer of my invention in which optical elements corresponding to these in FIGS. 3 and 4 have been given corresponding reference characters. The apparatus comprising the laser 25, the mask 26 in which the source pinhole S is formed, the retroreflector 28, the exit mask 26 in which the exit pinhole O is formed, and the detector 47, may be the same as in FIGS. 3 and 4. These components form a fixed frame of reference and are all fixed relative to each other on a common support.

The stage plate comprises a frame 71 relatively movable with respect to the other optical elements and carrying a pair of parallel mirrors 72 and 73 that perform the functions of the mirrors 36 and 45 in FIG. 3. The center plane of the stage plate is equidistant between the mirrors 72 and 73, and is indicated by the dotted line 74. The fiducial F in FIG. 11 is located between the axes AD and A'D' such that when the plane 74 intersects the fiducial F the rays AD and $Aa''A'D'$ in two optical paths are equal. The displacement $x$ to which the interferometer is sensitive is measured as before, as the distance from the fiducial F to the center plane 74 along a normal to the center plane.

Having thus described my invention, what I claim is:

1. An interferometer comprising means approximating a point source of substantially isotropic radiation, a retroreflector having a beam splitting surface in the path of radiation from said source and fixed relative to said source for producing a first and a second beam of radiation, first and second reflectors, means for mounting said reflectors in spaced parallel relation, one of said reflectors being in the path of said transmitted beam and the other of said reflectors being in the path of said retroreflected beam, and means for receiving radiation reflected from said first and second reflectors.

2. The apparatus of claim 1, wherein said radiation receiving means includes means for forming an exit pinhole in the path of radiation reflected normal to said reflectors.

3. The apparatus of claim 1, in which said source of radiation is a source of coherent light, and in which said reflectors are mirrors.

4. The apparatus of claim 3, wherein said radiation receiving means includes means for forming an exit pinhole in the path of radiation reflected normal to said mirrors.

5. Measuring apparatus, comprising:
means for providing a first reference frame, said means including a rigid source means fixed in said frame; means for providing a fiducial indicative of a reference point fixed in said first reference frame with respect to said rigid source means; means for providing a second reference frame, said first and second frame means being relatively displaceable therebetween with more than one degree of freedom; means for coupling said first and second frame means and including a substantially isotropic source of coherent radiation extending from said rigid source means along at least two paths to said second frame means, retroflective means in one of said paths, two opposed parallel mirrors fixed in said second frame each in position to reflect radiation in a different one of said paths, and means for receiving said reflected radiation, said radiation receiving means including means for providing an indication of a displacement in said one degree of freedom of said second reference frame means with respect to said reference point in any other said degree of freedom.

6. The apparatus of claim 5, wherein:
said displacement in said one degree of freedom is linear and is independent of rotation of said second reference frame about said fixed reference point.

7. The apparatus of claim 5, wherein:
said fixed reference point is at the center of said radiant energy paths.

8. The apparatus of claim 5, wherein:
said displacement indication means include means for providing an indication of the change in relative pathlengths resulting from said relative displacement, thereby to provide said indication of said linear displacement.

9. The apparatus of claim 8, wherein:
said displacement indication means respond only to reflected energies along incident radiant energy paths normal to said reflecting surfaces.

10. The apparatus of claim 9, wherein:
said radiant energy is monochromatic, coherent and has a spherical wavefront.

11. The apparatus of claim 10, wherein:
said radiant energy is light energy.

12. In a interferometer, source means for producing a first beam of radiant energy having a spherical wavefront, a beam splitter fixed with respect to said source means in the path of said first beam to produce a second transmitted beam and a third reflected beam, a pair of reflectors having plane surfaces orthogonal to each other and to said beam splitter to translate said third beam and rotate said third beam through 180 degrees, reference means movable with respect to said source means, two parallel reflectors mounted on said reference means, one of said reflectors being located in the path of said second beam and the other of said reflectors being located in the path of said third beam, and energy receiving means including an exit aperture located adjacent said beam splitter in position to receive normal rays reflected from said reflectors.

13. The apparatus of claim 12, in which said radiant energy is coherent light, and in which said reflectors are mirrors.

14. An interferometer, comprising first means for splitting a beam of coherent radiation into two separate beams each of which are divergent, second means for directing said divergent beams onto opposite parallel mirror surfaces of a stage plate relatively movable with respect to said first and second means, said second means comprising a retroreflector in the path of one of said beams, and means for receiving rays reflected normal to said mirrors for forming an interference pattern.

15. In an interferometer comprising an isotropic source of radiation and means for dividing a portion of the radiation from said source into first and second beams each of which are divergent, a retroreflector in the path of said first beam, means for directing said second beam and the retroreflected first beam onto two parallel mirrors attached to a stage plate movable in the path of said beams and means for receiving radiation reflected from said mirrors to form an interference pattern.

16. An interferometer comprising means for splitting a beam of coherent radiation into two beams each of which are divergent, means for directing said divergent beams onto opposed parallel reflectors at angles such that corresponding rays in said divergent beams are normal to said reflectors independently of the angle between the mirrors and means for receiving rays reflected normal to said mirrors to form an interference pattern.

References Cited

On Mobius Band Interferometers; Optica Acta, vol. 11, No. 3, W. H. Steel.

RONALD L. WIBERT, Primary Examiner